(12) United States Patent
Purvis et al.

(10) Patent No.: US 8,661,338 B2
(45) Date of Patent: Feb. 25, 2014

(54) SYSTEM AND METHOD FOR DYNAMIC DOCUMENT LAYOUT

(75) Inventors: Lisa S. Purvis, Fairport, NY (US); Steven J. Harrington, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 969 days.

(21) Appl. No.: 10/757,688

(22) Filed: Jan. 14, 2004

(65) Prior Publication Data
US 2005/0154980 A1 Jul. 14, 2005

(51) Int. Cl.
*G06F 17/24* (2006.01)
*G06F 17/27* (2006.01)

(52) U.S. Cl.
USPC ........... 715/249; 715/210; 715/243; 715/247; 715/251; 707/620; 707/625; 382/112; 382/159; 382/162

(58) Field of Classification Search
USPC ......... 715/513, 530, 523, 210, 243, 247, 249, 715/251; 707/620, 625; 382/112, 159, 162
See application file for complete search history.

(56) References Cited

U.S. PATENT DOCUMENTS

| | | | | |
|---|---|---|---|---|
| 4,751,740 A * | 6/1988 | Wright | .......................... | 382/180 |
| 5,438,657 A * | 8/1995 | Nakatani | ...................... | 715/223 |
| 5,845,304 A * | 12/1998 | Iijima | ........................... | 715/530 |
| 6,047,093 A * | 4/2000 | Lopresti et al. | ............... | 382/310 |
| 6,088,711 A * | 7/2000 | Fein et al. | ...................... | 715/269 |
| 6,393,442 B1 * | 5/2002 | Cromarty et al. | ............. | 715/523 |
| 6,463,440 B1 * | 10/2002 | Hind et al. | .................... | 707/102 |
| 6,519,617 B1 * | 2/2003 | Wanderski et al. | ........... | 715/513 |
| 6,778,703 B1 * | 8/2004 | Zlotnick | ....................... | 382/218 |
| 6,842,876 B2 * | 1/2005 | Schilit et al. | .................. | 715/530 |
| 6,880,014 B2 * | 4/2005 | Brown et al. | ................. | 709/227 |
| 7,197,702 B2 * | 3/2007 | Niyogi et al. | ................. | 715/234 |
| 7,272,258 B2 * | 9/2007 | Berkner et al. | ............... | 382/176 |
| 2002/0080180 A1 * | 6/2002 | Mander et al. | ................ | 345/769 |
| 2004/0019850 A1 | 1/2004 | Purvis et al. | | |
| 2004/0019851 A1 | 1/2004 | Purvis et al. | | |
| 2004/0140977 A1 * | 7/2004 | Hakamada | ..................... | 345/467 |

OTHER PUBLICATIONS

Sandra Haynes, "Microsoft Computer Dictionary, Fifth Edition", Publisher: Microsoft, p. 171, 372.*
Lisa Purvis, "A Genetic Algorithm Approach to Automated Custom Document Assembly", Proceedigns of the Second International Workshop on Intelligent Systems Design and Applicaitons, Aug. 2002, Atlanta, USA.*
Forrest, S., "Proceedings of the Fifth International Conference on Genetic Algorithms," University of Illinois at Urbana-Champaign, Morgan Kaufmann Publishers, San Mateo, California, Jul. 17-21, 1993.
Vanegas et al., "Computing in Civil Engineering," Proceedings of the Third Congress held in conjunction with A/E/C Systems '96, Published by the American Society of Civil Engineers, Anaheim California, Jun. 17-19, 1996.

* cited by examiner

*Primary Examiner* — Stephen Hong
*Assistant Examiner* — Wilson Tsui

(57) ABSTRACT

A system for case based, dynamic document layout in accordance with embodiments of the present invention includes a comparison system, a determination system, and a mutation system. The comparison system that compares one or more elements of at least a portion of an original document against the same elements in at least a portion each of a plurality of stored documents. The determination system identifies the stored document with the portion which is closest to the portion of the original document based on the comparing. The mutation system applies one or mutators to the portion of the original document which were used in the portion of the identified stored document.

34 Claims, 4 Drawing Sheets

SYSTEM AND METHOD FOR DYNAMIC DOCUMENT LAYOUT

FIELD

The present invention relates to systems and methods for case based, dynamic document layout and, more particularly, to a system and method for case based, dynamic document layout using case based mutations.

BACKGROUND

With today's document workflows, the creator of a document often does not have control over the final appearance of the document. For example, documents can be posted on and retrieved from the web or can be emailed to their audience. The individual which has obtained or received the document selects the printer or display device on which the document is going to be displayed. Unfortunately, the document may not be properly formatted for printing or display on the selected printer or display device.

To resolve this problem, automated document-layout systems have been developed. These prior document-layout systems have relied on the use of fixed algorithms and style sheets to determine a document's layout. Although these types of document-layout systems work for some applications, the result is rigid, inflexible and thus limits their use to certain classes of document and types of layout. Additionally, these types of systems tend to make all documents look alike which is not always desirable. To that end, a genetic algorithm approach to layout has been developed, enabling varying layouts to be automatically generated. For such a genetic algorithm process, a series of mutations is applied to a layout in order to evolve it to an optimal layout. However, two challenges remain in current systems that apply such mutations. First, the mutation algorithms must be programmed beforehand, and then only those that have been programmed can be applied. This is a difficulty since it is not always possible to anticipate beforehand and create algorithms for all of the possible coordinated mutations that might be valuable in an automated document-layout scenario. A second remaining challenge in applying mutations for automated layout is knowing which mutations to apply, and in what sequence to apply them. The process detailed in the present invention addresses both of these challenges.

SUMMARY

A system for case based, dynamic document layout in accordance with embodiments of the present invention includes a comparison system, a determination system, and a mutation system. The comparison system that compares one or more elements of at least a portion of an original document against the same elements in at least a portion each of a plurality of stored documents. The determination system identifies the stored document with the portion which is closest to the portion of the original document based on the comparing. The mutation system applies one or more mutators to the portion of the original document that was used in the portion of the identified stored document.

A method and a computer readable medium having stored thereon instructions for case based, dynamic document layout which when executed by a processor, causes the processor to perform steps comprising comparing one or more elements of at least a portion of an original document against the same elements in at least a portion each of a plurality of stored documents. The stored document with the portion which is closest to the portion of the original document is identified based on the comparing. The one or more mutators are applied to the portion of the original document that was used in the portion of the identified stored document.

The present invention provides a system and method for a dynamic document layout that is able to learn new intelligent mutations during operations. The present invention also determines the most appropriate sequence of mutators given the current individual's characteristics. By combining case-based mutations with genetic algorithms for dynamic document layout, the present invention provides a more efficient and reliable automated scheme for dynamic document layout.

DETAILED DESCRIPTION

Figure 1:
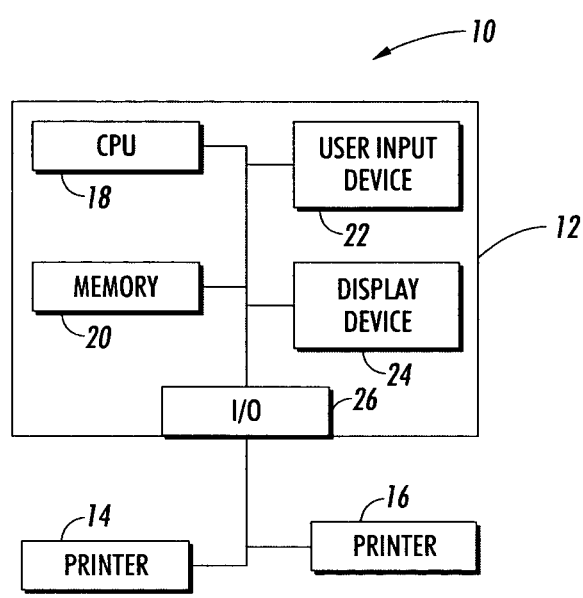
FIG. 1 is a block diagram of a system for a dynamic document layout in accordance with embodiments of the present invention.

A system 10 for dynamic document layout in accordance with embodiments of the present invention is illustrated in FIG. 1. The system 10 includes a document layout processing system 12 and printers 14 and 16, although the system 10 can comprise other numbers and types of systems, devices, and components in other configurations. The present invention provides a system 10 and method for dynamic document layout that is able to learn new intelligent mutators during operations and is able to determine the most appropriate sequence of mutators given a document's current characteristics.

Referring to FIG. 1, the document layout processing system 12 is coupled to the printers 14 and 16, although the document layout processing system 12 could be coupled to other types and numbers of devices in other configurations. A variety of communication systems and/or methods can be used to operatively couple and communicate between the document layout processing system 12 and the printers 14 and 16, including a direct connection, a local area network, a wide area network, the world wide web, modems and phone lines, or wireless communication technology each having communications protocols. In these embodiments, the printers 14 and 16 are coupled to the document layout processing system 12 by a hard-wire connection over a local area network, although other types of connections, devices, and networks, such as a wireless communication system, could be used.

The document layout processing system 12 includes a processor 18, a memory storage device 20, a user input device 22, a display device 24, an and an input/output interface device 26 which are coupled together by a bus 28 or other link, although other types of document layout processing systems comprising other numbers and types of components in other configurations can be used. The processor 18 executes a program of stored instructions for one or more aspects of the present invention as described herein, including the method for case based, dynamic document layout as described with reference to FIG. 2.

Figure 2:
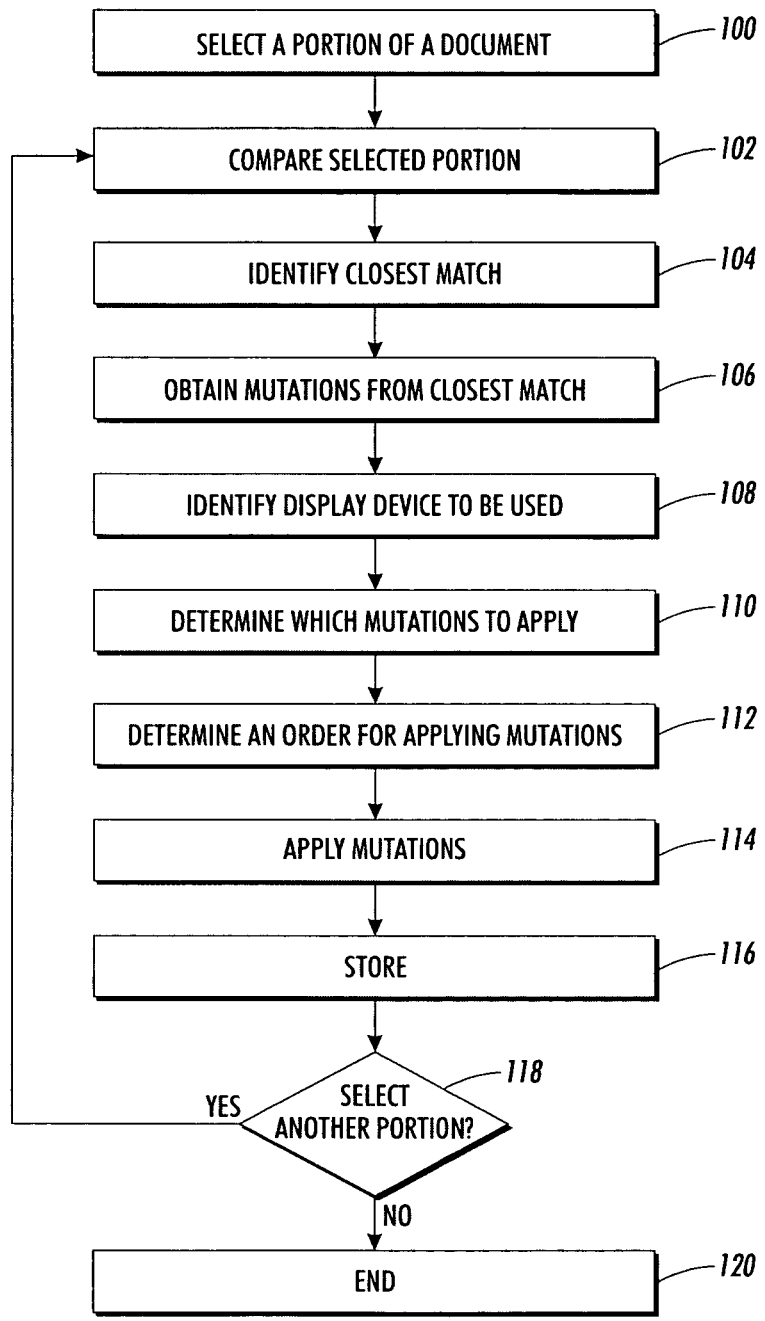
FIG. 2 is a flow chart of a method for a dynamic document layout in accordance with embodiments of the present invention.

The memory storage device 20 stores the programmed instructions for one or more aspects of the present invention as described herein, including the method for case based, dynamic document layout as described with reference to FIG. 2, for execution by the processor 18, although some or all of the programmed instructions could be stored and/or executed elsewhere, such as in printer 14 or printer 16. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to the processor, could be used for memory storage device 20 to store the programmed instructions described herein, as well as other information. The user input device 22 enables an operator to generate and transmit signals or commands to the processor 18, such as a request to print or display a document on printer 14 or printer 16. A variety of different types of user input devices could be used for user input device 22, such as a keyboard or computer mouse. The display device 24 displays information for the operator of the document layout processing system 12, such as an image of the document layout or the status of the print job at printer 14. A variety of different types of display devices could be used for display device 24, such as a display monitor. The input/output interface system 26 is used to operatively couple and communicate between the document layout processing system 12 and the printers 14 and 16.

The printer 14 is coupled to the document layout processing system 12, although other types of devices can be coupled to the document layout processing system 12. The printer 14 prints documents received from the document processing system 12. The printer 14 has a particular set of characteristics when printing a document which effect the resulting printed image of the document, such as margins or a particular paper size on which the document is printed. Since the components of a printer 14, including its connections and operation, are well known, they will not be described in detail here.

The printer 16 is also coupled to the document layout processing system 12, although other types of devices can be coupled to the document processing system 12. The printer 16 also prints documents received from the document processing system 12. The printer 16 also has a particular set of characteristics when printing a document which effect the resulting printed image of the document which are different from the characteristics of printer 14, although both printers 14 and 16 could have the same characteristics when printing a document. Like printer 14, the components of a printer 16, including their connections and operation, are well known, they will not be described in detail here.

A method for a case based, dynamic document layout in accordance with embodiments of the present invention will now be described with reference to FIGS. 1-7. In step 100, the document processing system 12 selects a portion of an original document, although other portions or all of the original document could be selected for determining a layout. The portion of the document selected is the portion that needs re-layout or adjustment. The original document can be obtained in a variety of different manners, such as retrieved from the web, from an e-mail attachment, from another computer system, or from a document created by the operator.

In step 102, the document processing system 12 compares one or more elements of the selected portion of the original document against the same types of elements in portions of a plurality of other stored documents obtained from memory storage device 20, although other types of comparisons of other numbers and types of elements and other portions could be used. A variety of different types of elements could be used by the document processing system 12 in this comparison, such as font size, font type, number of lines of text, line spacing, number of alphanumeric characters, size of an outer perimeter of the arrangement of alphanumeric characters, and number of images. The document processing system 12 can assign a score to each comparison, such as one score for a complete match, another score for a partial match, and no score when there is no match, although other manners for assigning a score can be used.

In step 104, the document processing system 12 identifies which stored document with the portion which is closest to the portion of the original document based on the comparison of the selected elements. In these embodiments, the document processing system 12 generates a score based on the comparison of the elements of the selected portion of the original document against the same types of elements in portions of a plurality of other stored documents. The document processing system 12 identifies the stored document with the portion which is closest to the selected portion of the original document based on the highest generated score, although the document processing system 12 could use other ways to identify the stored document with the closest portion.

Figures 3, 4, 5:
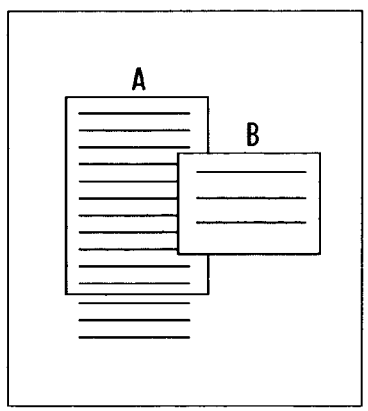
FIG. 3 is a screen shot of a displayed document with increased font size to increase legibility.
FIG. 4 is a screen shot of a displayed document with shorter line lengths to increase legibility.
FIG. 5 is a screen shot of a document in need of a mutations.

In step 106, the document processing system 12 obtains the one or more mutators used in the identified, stored document from memory storage device 20 for possible use in the selected portion of the original document. A variety of different types of mutators could be obtained, such as mutators for adjusting a font of type, adjusting line spacing, adjusting at least one color, and adjusting a location of at least one section in the portion of the original document. For example, the mutator for increasing font size to increase legibility is illustrated in FIG. 3 and the mutator for making the line lengths shorter to increase legibility is shown in FIG. 4, although again other types of mutators alone or in different combinations could be obtained and used.

Referring back to FIG. 2, in step 108 the document processing system 12 identifies the device, such as printer 14 or printer 16, on which the original document is to be displayed. The document processing system 12 identifies the device based on instructions received from an operator using user input device 22 requesting a particular device to display the original document, although other ways of identifying the display device can be used, such as a programmed selection in the memory storage device 20 of document processing system 12 to use a particular printer 14 or 16 for a print job. As part of the identification process, the document processing system 12 obtains information from memory storage device 20 about the characteristics of the device, although other ways of obtaining information about the characteristics of the device can be used, such as an inquiry by the document processing system 12 to the device, such as printer 14 or 16, for the information.

In step 110, the document processing system 12 determines which of the one or more mutators obtained from the identified, stored document to use on the selected portion of the original document. The document processing system 12 determines which of the mutators to use based on the characteristics of the device on which the original document is going to be displayed and based on one or more elements of the original document, although other manners for determining which of the mutators to select can be used. For example, if the printer 14 selected for the printing job is a black-and-white printer, then a mutator for altering color obtained from the identified, stored document is irrelevant and would not used by the document processing system 12. In another example, the document processing system 12 could have lists of mutators stored in memory 20 which are associated with particular types of documents, such as for text documents, documents with text and images, and documents with images, and then the document processing system 12 would determine to use the obtained mutators that were on appropriate stored list for the type of document that matches the portion of the original document or the original document.

The document processing system 12 also determines using one or more algorithms for document layout stored in memory storage device 20 and one or more other style sheets stored in memory storage device 20 one or more other mutators to apply to the selected portion of the original document, although other manners for determining which, if any, other the mutators to use can be implemented. Standard or generic algorithms and methods for determining mutators and other parameters for document layout, which are stored as programmed instructions for execution by document processing system 12, are disclosed in pending U.S. patent application Ser. No. 10/202,046 for a, "Constraint-Optimization System and Method for Document Component Layout Generation" and pending U.S. patent application Ser. No. 10/202,188 for a, "Constraint-Optimization System and Method for Document Component Layout Generation" which are both herein incorporated by reference in their entirety. Since these algorithms and methods used in determining mutators for standard or generic document layout are well known, they will not be described in detail here again.

In step 112, the document processing system 12 determines an order or sequence for applying the one or more obtained mutators and the one or more determined mutators to the selected portion of the original document. In these particular embodiments, the document processing system 12 determines the order based on the order the obtained mutators were used in the identified, stored document, although other manners for determining the order for applying the mutators could be used. For example, the ordering may be a learned function based on noting the effectiveness of orderings on the document quality measure. In another example, the selected order for applying mutators could be based on a predetermined priority order for applying mutators which is stored in memory 20. The document processing system 12 would determine where each of the obtained mutators occurred in the stored priority order and then would base the order of applying the mutators based on this determination.

In step 114, the document processing system 12 applies the selected one or more obtained mutators and the one or more determined mutators in the determined ordered order to the selected portion of the original document. Since methods for applying mutators to a document are well known, they will not be described in detail here again.

Figure 6:
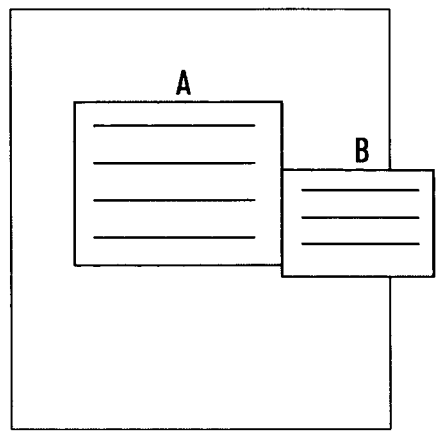
FIG. 6 is a screen shot of the document shown in FIG. 5 with an inappropriate choice and sequence of mutators.
Figure 7:
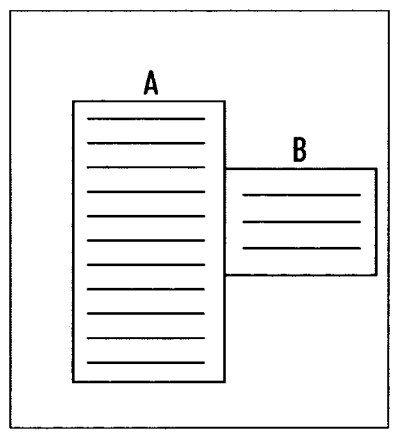
FIG. 7 is a screen shot of the document shown in FIG. 5 with an optimized choice and sequence of mutators.

By way of example only, a document which needs a new document layout for display is illustrated in FIG. 5. If the present invention is not utilized, then the application of mutators to the document can result in an inappropriate choice and sequence of applying mutators to the document as illustrated in FIG. 6. If the present invention is utilized, then the choice and sequence of the applied mutators produces a desired result for the document to be displayed as illustrated in FIG. 7.

In step 116, the document processing system 12 stores the selected portion of the original document with the applied mutators as one of the stored documents in memory storage device 20. The newly stored portion of the original document can now be used to assist with determining the layout of other portions of the original document or of other documents to be displayed.

In step 118, the document processing system 12 determines if another portion of the original document should be selected for determining a dynamic document layout. If one or more additional portions in the original document are desired to be selected, for example if other portions of the original document have not already been selected, then the Yes branch is taken to step 1102 where the process for determining a dynamic document layout begins again for the newly selected portion of the original document in the same manner as described above. If no more portions in the original document are desired to be selected, for example if the entire original document was selected for processing or all of the portions of the original document have already been selected, then the No branch is taken to step 120 where the process for determining a dynamic document layout ends.

Although one embodiment of the method for a case based, dynamic document layout for one embodiment of the present invention is described above, other embodiments of the present invention can have other combinations of the steps without some of these steps, such as one or more of the steps 108, 110, 112, 116, and 118 which are described in greater detail above. By way of example, another embodiment of the method for a case based, dynamic document layout comprises performing the steps 100, 102, 104, 106, 114, 116, 118, and 120 described in greater detail above.

Accordingly, the present invention provides a case-based approach to applying mutators to a document to obtain a desirable document layout. The present invention also continuously stores the determined layouts for use in determining the layout of future documents. By combining case-based mutators with genetic algorithms for dynamic document layout, the present invention provides a more efficient and reliable automated scheme for dynamic document layout.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefor, is not intended to limit the claimed processes to any order except as may be specified in the claims. Accordingly, the invention is limited only by the following claims and equivalents thereto.

What is claimed is:

1. A document layout processing device comprising:
at least one processor;
at least one memory coupled to the processor configured to execute programmed instructions stored in the memory comprising:
a comparison system configured to compare one or more elements of at least a portion of an original document against the same types of elements in at least a portion each of a plurality of stored documents, wherein the portion of the original document is the portion that requires adjustment or re-layout;
a determination system configured to identify a particular stored document in the plurality of stored documents, with the portion which is closest to the portion of the original document based on the comparing;
an identification system configured to identify a designated output device and designated output device characteristics;
a mutation system configured to apply one or more mutators, to the portion of the original document which were applied to mutate the portion of the identified particular stored document, to form a mutated portion in the original document, having obtained one or more mutators from a list of stored mutators which correspond to the identified particular stored document, wherein the mutation system determines which of the one or more mutators to apply based on one or more designated output device characteristics and the identified particular stored document that matches the portion of the original document; and
wherein the mutation system is further configured to apply the determined one or more mutators by retrieving stored priority data and applying the determined one or more mutators to the portion of the original document according the retrieved stored priority order.

2. The document layout processing device as set forth in claim 1 wherein the processor is further configured to execute programmed instructions stored in the memory comprising a selection system configured to select the portion of the original document for the comparing.

3. The document layout processing device as set forth in claim 1 wherein the determination system further comprises a scoring system configured to generate a score for each of the comparisons of the portion of the original document against each of the portions of each of the plurality of stored documents, wherein the determination system identifies the particular stored document with the portion with the score which is closest to the portion of the original document based on the generated scores.

4. The document layout processing device as set forth in claim 1 wherein the processor is further configured to execute programmed instructions stored in the memory comprising an application system configured to determine which of the one or more mutators which were used in the portion of the identified stored document are to be used by the mutation system on the original document.

5. The document layout processing device as set forth in claim 1 wherein the processor is further configured to execute programmed instructions stored in the memory comprising an output system which outputs the original document after application of the one or more mutators.

6. The document layout processing device as set forth in claim 1 wherein the processor is further configured to execute programmed instructions stored in the memory comprising storing the modified, original document with the applied one or more mutators as one of the stored documents.

7. The device of claim 1, wherein the one or more mutators include a font type adjustor adapted to electronically adjust a font of the portion of the original document, at least one color adjustor adapted to electronically adjust a color of the portion of the original document, and at least one of a line spacing adjustor and at least one section location adjustor in the portion of the original document, adapted to electronically adjust a line spacing and a section location, respectively, of the portion of the original document.

8. A method comprising:
comparing one or more elements of at least a portion of an original document against the same types of elements in at least a portion each of a plurality of stored documents, wherein the portion of the original document is the portion that requires adjustment or re-layout;
determining a particular stored document in the plurality of stored documents, with the portion which is closest to the portion of the original document based on the comparing;
identifying a designated output device and output device characteristics;
applying one or more mutators to the portion of the original document which were applied to mutate the portion of the determined particular stored document, to form a mutated portion in the original document, having obtained one or more mutators from a list of stored mutators which correspond to the determined particular stored document, wherein the applying further comprises determining which of the one or more stored mutators to apply based on one or more of the characteristics of the designated output device and the identified particular stored document that matches the portion of the original document; and wherein the applying further comprises determining an order for the applying of the determined one or more mutators to the portion of the original document, according to stored priority order.

9. The method as set forth in claim 8 further comprising performing the comparing, the determining, and the applying on one or more other portions of the original document.

10. The method as set forth in claim 8 further comprising selecting the portion of the original document for the comparing.

11. The method as set forth in claim 8 wherein the determining further comprises:
generating a score for each of the comparisons of the portion of the original document against each of the portions of each of the plurality of stored documents; and
identifying the particular stored document with the portion with the score which is closest to the portion of the original document based on the generated scores.

12. The method as set forth in claim 8 wherein the applying further comprises determining which of the one or more mutators which were used in the portion of the identified stored document to use in the applying.

13. The method as set forth in claim 8 further comprising outputting the original document after application of the mutators.

14. The method as set forth in claim 8 further comprising one of the elements in the comparing is the type of output device used in the outputting.

15. The method as set forth in claim 8 further comprising storing the output, original document with the applied mutators as one of the stored documents.

16. The method as set forth in claim 8, wherein the one or more mutators include a font type adjustor adapted to electronically adjust a font of the portion of the original document, at least one color adjustor adapted to electronically adjust a color of the portion of the original document, and at least one of a line spacing adjustor and at least one section location adjustor in the portion of the original document, adapted to electronically adjust a line spacing and a section location, respectively, of the portion of the original document.

17. A non-transitory computer readable medium having stored thereon instructions for dynamic document layout which when executed by a processor, causes the processor to perform steps comprising:
comparing one or more elements of at least a portion of an original document against the same types of elements in at least a portion each of a plurality of stored documents, wherein the portion of the original document is the portion that requires adjustment or re-layout;

determining a particular stored document, amongst the plurality of stored documents, with the portion which is closest to the portion of the original document based on the comparing;

identifying a designated output device and designated output device characteristics;

applying one or more mutators to the portion of the original document which were applied to mutate the portion of the identified particular stored document, to form a mutated portion in the original document, having obtained one or more mutators from a list of stored mutators which correspond to the identified stored document, wherein the applying further comprises determining which of the one or more stored mutators to apply based on one or more characteristics of the designated output device and the identified particular stored document that matches the portion of the original document;

the applying further comprises determining an order for the applying of the determined one or more mutators to the portion of the original document, according to a stored priority order.

18. The medium as set forth in claim 17 further comprising performing the comparing, the determining, and the applying on one or more other portions of the original document.

19. The medium as set forth in claim 17 further comprising selecting the portion of the original document for the comparing.

20. The medium as set forth in claim 17 wherein the determining further comprises:

generating a score for each of the comparisons of the portion of the original document against each of the portions of each of the plurality of stored documents; and identifying the particular stored document with the portion with the score which is closest to the portion of the original document based on the generated scores.

21. The medium as set forth in claim 17 wherein the applying further comprises determining which of the one or more mutators which were used in the portion of the identified stored document to use in the applying.

22. The medium as set forth in claim 17 further comprising outputting the original document after application of the mutators.

23. The medium as set forth in claim 17 further comprising identifying an output device on which the outputting of the original document with the applied mutators will occur wherein one of the elements in the comparing is the type of output device used in the outputting.

24. The medium as set forth in claim 17 further comprising storing the output, original document with the applied mutators as one of the stored documents.

25. The medium as set forth in claim 17, wherein the one or more mutators include a font type adjustor adapted to electronically adjust a font of the portion of the original document, at least one color adjustor adapted to electronically adjust a color of the portion of the original document, and at least one of a line spacing adjustor and at least one section location adjustor in the portion of the original document, adapted to electronically adjust a line spacing and a section location, respectively, of the portion of the original document.

26. A method comprising:

comparing one or more elements of at least a portion of an original document against the same types of elements in at least a portion each of a plurality of stored documents, wherein the portion of the original document is the portion that requires adjustment or re-layout;

determining a particular stored document in the plurality of stored documents, with the portion which is the closest match to the portion of the original document based on the comparing;

identifying a designated output device with one or more characteristics;

obtaining one or more mutators from a list of stored mutators which were applied to mutate the portion of the determined particular stored document; and applying the obtained one or more mutators to the portion of the original document based on one or more characteristics of the designated output device and the applying further based on a stored priority order.

27. The method as set forth in claim 26 further comprising performing the comparing, the determining, and the applying on one or more other portions of the original document.

28. The method as set forth in claim 26 further comprising selecting the portion of the original document for the comparing.

29. The method as set forth in claim 26 wherein the determining further comprises:

generating a score for each of the comparisons of the portion of the original document against each of the portions of each of the plurality of stored documents; and identifying the particular stored document with the portion with the score which is closest to the portion of the original document based on the generated scores.

30. The method as set forth in claim 26 wherein the applying further comprises determining which of the one or more mutators which were used in the portion of the identified stored document to use in the applying.

31. The method as set forth in claim 26 further comprising outputting the original document after application of the mutators.

32. The method as set forth in claim 26 further comprising identifying an output device on which the outputting of the original document with the applied mutators will occur wherein one of the elements in the comparing is the type of output device used in the outputting.

33. The method as set forth in claim 26 further comprising storing the output, original document with the applied mutators as one of the stored documents.

34. The method as set forth in claim 26, wherein the one or more mutators include at least one of a font type adjustor adapted to electronically adjust a font of the portion of the original document, at least one color adjustor adapted to electronically adjust a color of the portion of the original document, and at least one of a line spacing adjustor and at least one section location adjustor in the portion of the original document, adapted to electronically adjust a line spacing and a section location, respectively, of the portion of the original document.

* * * * *